Figures 1, 2:
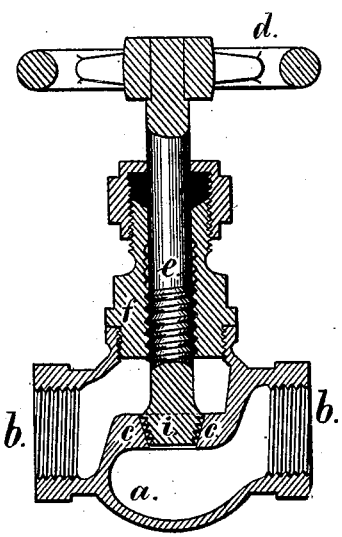

J. MOFFET.
Globe-Valve.

No. 167,010.

Patented Aug. 24, 1875.

Witnesses.
Chas H. Smith
Harold Serrell

Inventor.
John Moffet.
per Lemuel W. Serrell
atty.

UNITED STATES PATENT OFFICE

JOHN MOFFET, OF PAMRAPO, NEW JERSEY.

IMPROVEMENT IN GLOBE-VALVES.

Specification forming part of Letters Patent No. 167,010, dated August 24, 1875; application filed January 8, 1875.

*To all whom it may concern:*

Be it known that I, JOHN MOFFET, of Pamrapo, in the county of Hudson and State of New Jersey, have invented an Improvement in Globe-Valves, of which the following is a specification:

Globe-valves have been made with a flat seat, receiving a valve in the flat face, of which there are concentric grooves, the object being to dispense with the ordinary grinding operation and to make the valve seat itself.

My invention is an improvement upon the same, and relates to a globe-valve made with a conical seat and conical plug, containing peripheral grooves, whereby the valve will tightly close the orifice of the seat by a less pressure upon the screw-stem, because the ribs of the conical plug are pressed upon the inclined surface of the seat, and by the sliding movement, incidental thereto, the valve is made to fit the seat with facility and accuracy, and the ribs of the cone, from time to time, are compressed to the shape of the seat; hence the valve wears tight instead of requiring to be ground to its seat, and with the numerous globe-valves now in use the conical valves can be altered to contain my improvement.

In the drawing, Figure 1 is a section of the valve complete, and Fig. 2 is an end view of the conical valve.

The body $a$, with the coupling-screws $b\ b$ and conical valve-seat $c$, are of usual construction, and the hand-wheel $d$, screw-spindle $e$, and cap $f$ are of any desired character. The valve $i$, at the end of the spindle $e$, is of a conical shape corresponding to the valve-seat, but the periphery of the valve is made with V-shaped ribs projecting between grooves that are turned into the surface of the cone, so that when the valve is pressed upon the seat the valve seats itself without grinding, because the pressure easily bends or compresses the edges of the ribs as they slide down the inclined surface of the seat until a tight bearing is made of the valve upon its seat.

I am aware that conical valves, used with plain surfaces, are not new, and that ribs have been used on flat valves; and lay no claim to such devices, as my invention overcomes all the objections to such construction which are in the conical plain surface-valve and seat; that the cause of their leaking after being used is an opening made lengthwise of the valve or seat, or both, which cannot be closed by a plain conical surface; and again obstructions are liable to get in the valve, which prevents it being closed.

By use of my improvement the conical-ribbed valve and plain tapering seat, any obstruction in the valve is cut or crushed by the ribs and any leakage is stopped by a slight turn of the valve, and as the ribs become worn, or the seat is worn, the next larger rib is forced down to take its place, and by the conical form of the valve it is always guided into the seat.

In my improvement the sharp points come in contact with the seat at an angle, thereby making the points more sharp, and the valve is always tight.

Having thus fully described my invention, what I claim, and desire to secure by Letters Patent, is—

The body $a$ having the plain tapering metallic valve-seat $c$, in combination with metallic conical V-shaped ribbed valve $i$ and screw-spindle $e$, all constructed and arranged substantially as and for the purpose herein specified.

Signed by me this 5th day of January, 1875.

JOHN MOFFET.

Witnesses:
   GEO. T. PINCKNEY,
   CHAS. H. SMITH.